(12) United States Patent
Pretz et al.

(10) Patent No.: US 9,370,759 B2
(45) Date of Patent: Jun. 21, 2016

(54) REACTOR AND FEED DISTRIBUTION ASSEMBLY

(71) Applicant: Dow Global Technologies LLC, Midland, MI (US)

(72) Inventors: Matthew Pretz, Lake Jackson, TX (US); Don F. Shaw, Denville, NJ (US); Richard E. Walter, Long Valley, NJ (US); Mark Stewart, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/425,902

(22) PCT Filed: Sep. 16, 2013

(86) PCT No.: PCT/US2013/059985
§ 371 (c)(1),
(2) Date: Mar. 4, 2015

(87) PCT Pub. No.: WO2014/043638
PCT Pub. Date: Mar. 20, 2014

(65) Prior Publication Data
US 2015/0231586 A1    Aug. 20, 2015

Related U.S. Application Data

(60) Provisional application No. 61/701,785, filed on Sep. 17, 2012.

(51) Int. Cl.
*B01J 8/44* (2006.01)
*B01J 8/18* (2006.01)
*B01J 8/24* (2006.01)
*B01J 8/00* (2006.01)

(52) U.S. Cl.
CPC ........ *B01J 8/44* (2013.01); *B01J 8/0015* (2013.01); *B01J 8/1809* (2013.01); *B01J 8/1827* (2013.01); *B01J 8/24* (2013.01); *B01J 2208/00548* (2013.01); *B01J 2208/00752* (2013.01); *B01J 2208/00769* (2013.01); *B01J 2208/00884* (2013.01); *B01J 2208/00893* (2013.01); *B01J 2208/00938* (2013.01)

(58) Field of Classification Search
CPC ............. B01J 8/24; B01J 8/44; B01J 8/1827; B01J 8/015; B01J 8/1809; B01J 2208/00548; B01J 2208/00752; B01J 2208/00938; B01J 2208/00769
USPC .................................... 422/143, 311
See application file for complete search history.

(56) References Cited

U.S. PATENT DOCUMENTS

| 3,277,582 A | 10/1966 | Munro Neil et al. |
| 3,370,361 A | 2/1968 | Guerrieri |
| 4,309,948 A | 1/1982 | Zielinski |
| 4,405,444 A | 9/1983 | Zandona |
| 6,199,835 B1 | 3/2001 | Chang et al. |
| 6,797,239 B1 | 9/2004 | Chen et al. |
| 2004/0052692 A1 | 3/2004 | Hottovy et al. |

*Primary Examiner* — Lessanework Seifu
(74) *Attorney, Agent, or Firm* — Brooks, Cameron & Huebsch, PLLC

(57) ABSTRACT

Embodiments include a reactor and feed distribution assembly. The reactor and feed distribution assembly can include a reactor vessel, a gaseous feed conduit, a catalyst feed conduit, a catalyst feed conduit housing, and a catalyst backflow diverter.

10 Claims, 4 Drawing Sheets

REACTOR AND FEED DISTRIBUTION ASSEMBLY

This application is a National Stage Application under 35 U.S.C. §371 of International Application Number PCT/US2013/059985, filed Sep. 16, 2013 and published as WO 2014/043638 on Mar. 20, 2014, which claims the benefit to U.S. Provisional Application 61/701,785, filed Sep. 17, 2012, the entire contents of which are incorporated herein by reference in its entirety.

This disclosure relates to a reactor and feed distribution assembly.

Hydrocarbons can be converted into desirable products through use of a fluidized bed reactor. Fluidized bed reactors can inject a liquid feed or a gas feed into the side of the reactor. However, as a diameter of the reactor increases, uniform distribution of the liquid feed and/or a gas feed can be difficult to attain, resulting in production inefficiency.

Figure 1A:
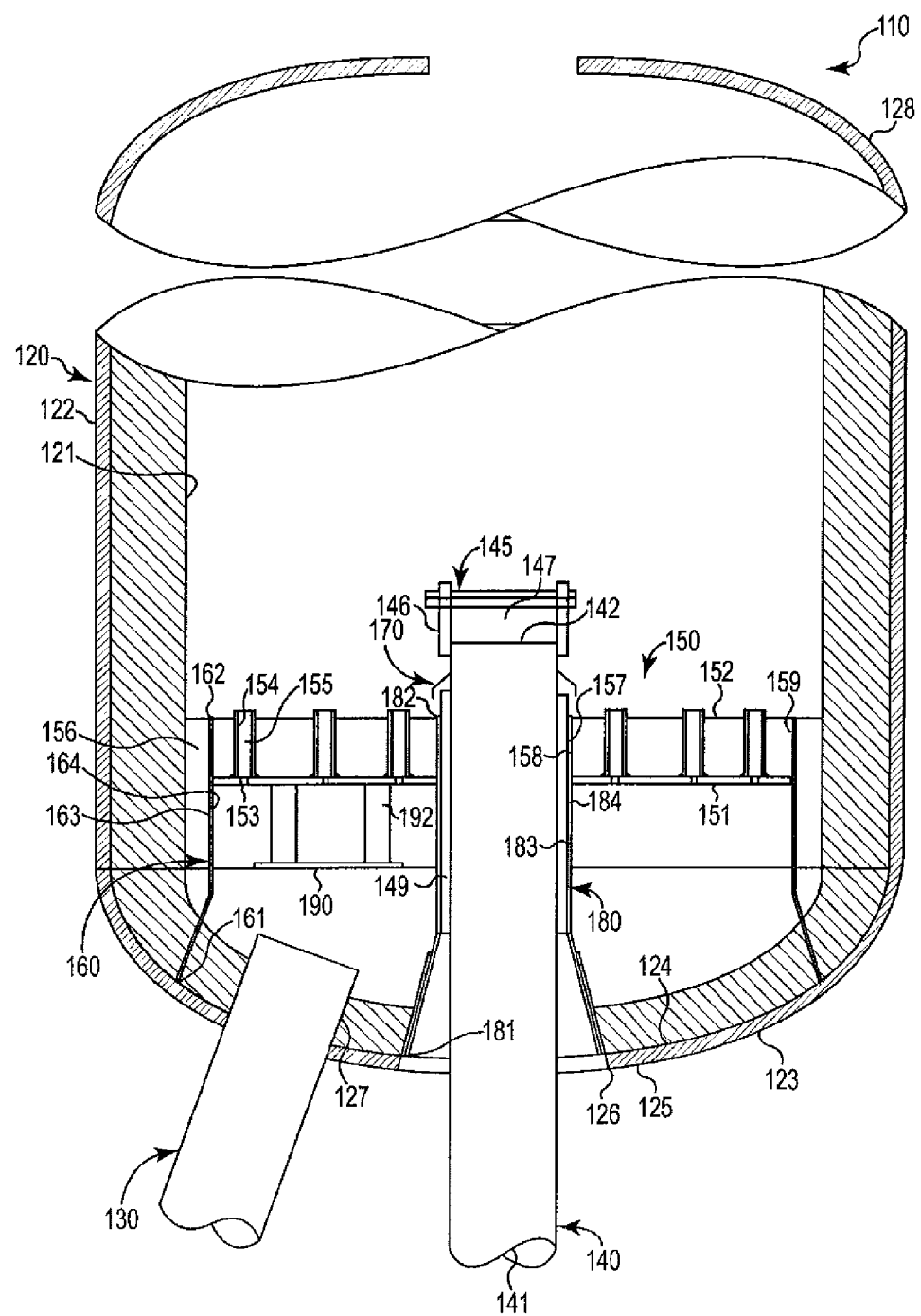
FIG. 1A illustrates a side view of a reactor and feed distribution assembly according to an embodiment of the present disclosure.

The figures herein follow a numbering convention in which the first digit or digits correspond to the drawing figure number and the remaining digits identify an element or component in the drawing. Similar elements or components between different figures may be identified by the use of similar digits. For example, 152 may reference element "52" in FIG. 1, and a similar element may be referenced as 252 in FIG. 2.

Elements shown and/or described in the various embodiments herein can be added, exchanged, and/or eliminated so as to provide a number of additional embodiments of the present disclosure. In addition, the proportion and the relative scale of the elements provided in the figures are intended to illustrate the embodiments of the present invention, and should not be taken in a limiting sense.

As mentioned, this disclosure provides a reactor and feed distribution assembly, which can be used for hydrocarbon conversion. For example, a gas, e.g., superheated propane and a catalyst based on e.g., alumina or alumina-silica, which includes gallium and/or platinum, may be fed to the reactor and feed distribution assembly where propane dehydrogenation occurs to provide propylene, hydrogen, and other byproducts. Advantageously, the reactor and feed distribution assembly can provide gas distribution across a bed of the reactor and feed distribution assembly to reduce propane coking, resulting in greater process efficiency as compared to other reactors where coking occurs and causes plugging, which can lead to poor distribution and loss of performance. Also, the amount of catalyst used can be reduced as a result of the uniform gas distribution across the bed of the reactor and the shape of the feed distribution assembly, which does not allow catalyst to drop below the gaseous feed distribution assembly, 150, as compared to a pipe and/or ring type of gas distributors.

In FIG. 1A, a reactor and feed distribution assembly 110 includes a reactor vessel 120. The reactor vessel 120 can have various configurations. The reactor vessel 120 can include one or more polyhedron, sphere, cylinder, cone, irregular shape, combinations thereof, and/or portions thereof. For example, the reactor vessel 120 can include a right hollow cylinder with a longitudinal axis. The reactor vessel includes a refractory-lined inner wall surface 121, an outer wall surface 122, a bottom 123, a top 128, a gaseous feed distribution assembly 150, a mounting plate 160, a catalyst feed conduit receiving passageway 126, and a gaseous feed conduit receiving passageway 127. The bottom 123 has an inner surface 124 and an outer surface 125.

The gaseous feed distribution assembly 150 includes a first surface 151 that faces the inner surface 124, a second surface 152 that is spaced apart from and faces away from the first surface 151, and an outer plate surface 159 having a portion that is normal to the first surface 151 and the second surface 152. The outer plate surface 159 can be welded to the first surface 151. In an example, distribution assembly insulation packing 156 is disposed between a lower portion of refractory-lined inner wall surface 121 that is nearer to where the refractory-lined inner wall surface 121 connects to the bottom 123 that to where the refractory-lined inner wall surface 121 connects to the top 128.

The first surface 151 and/or second surface 152 of the gaseous feed distribution assembly 150 can be refractory-lined, in an example. In addition, other materials with insulating properties (e.g., insulating material) can be disposed between the first surface 151 and the second surface 152. The refractory lining and/or insulating material can help prevent the first surface 151 of the gaseous feed distribution assembly 150 from heating to cause the propane to coke on the first surface 151.

The gaseous feed distribution assembly 150 defines a plurality of gas passageways 155 and a catalyst feed conduit passageway 157 that has an inner circumferential surface 158. Each of the plurality of gas passageways 155 are in fluid communication with the first surface 151 and the second surface 152 via first apertures 153 and second apertures 154. The plurality of gas passageways 155 can be even with and/or extend past (e.g., below) the first surface 151 and/or the second surface 152. The second apertures 154 can have a greater cross-sectional area than the first apertures 153, e.g., when a cross section of the second apertures 154 and the first apertures 153 are determined perpendicular to a longitudinal axis of one or more of the gas passageways 155 and a longitudinal axis of the catalyst feed tube.

The first apertures 153 and the second apertures 154 of the gaseous feed distribution assembly 150 can have uniform and/or varying cross-sectional areas, for example to help provide that an even distribution of gas passes through each of the plurality of gas passageways. For instance, gas passageways that are nearer to gaseous feed conduit 130 can have a greater pressure difference between the first surface 151 and the second surface 152 of the gaseous feed distribution assembly 150. As such, first apertures 153 of the gaseous feed distribution assembly 150 that are nearer to the gaseous feed conduit 130 can have a smaller cross-sectional area than first apertures 153 that are further from the gaseous feed conduit 130 to help equilibrate a pressure differential across the gaseous distribution assembly 150.

A ratio of an inside diameter of the first apertures 153 of the gaseous feed distribution assembly 150 to an inside diameter of the second apertures 154 of the gaseous feed distribution assembly 150 can be from 0.13 to 0.63 and preferably from 0.34 to 0.51. A ratio of the inside diameter of the first apertures 153 of the gaseous feed distribution assembly 150 to the inside diameter of the reactor vessel 120 is from 0.003 to 0.014 and preferably from 0.008 to 0.012. A ratio of the inside diameter of the second apertures 154 of the gaseous feed distribution assembly 150 to the inside diameter of the reactor vessel 120 is from 0.008 to 0.163 and preferably from 0.026 to 0.067. For some embodiments, e.g. embodiments including a non-circular cross-sectional area, ratios of the respective cross-sectional areas can be in the ranges discussed herein for embodiments including circular cross-sectional areas.

The reactor and feed distribution assembly 110 includes a mounting plate 160 for mounting and/or supporting the gaseous feed distribution assembly 150 to the reactor vessel 120 at the bottom 123. The mounting plate 160 includes a first end 161, which is operatively connected to the bottom 123, and a second end 162. The first end 161 and the second end 162 are spaced apart from one another and there between define an outer planar surface 163 that is spaced apart from an inner planar surface 164. The outer planar surface 163 is spaced apart from the refractory-lined inner wall surface 121 and the outer plate surface 159 is operatively connected to a portion of the inner planar surface 164 proximate to the second end 162 and apart from the first end 161.

The reactor and feed distribution assembly 110 includes a gaseous feed conduit 130 that is operatively connected to a gaseous feed conduit receiving passageway 127 that extends through the bottom 123 of the reactor vessel 120. The reactor and distribution assembly 110 can include a plurality of gaseous feed conduits 130. The plurality of gaseous feed conduits 130 can be operatively connected to a plurality of gaseous feed conduit receiving passageways e.g., that encircle the longitudinal axis of the reactor vessel 120.

The reactor and feed distribution assembly 110 can include a deflector plate 190 spaced apart from, and operatively connected to, a portion of the first surface 151 of the gaseous feed distribution assembly 150 by a plurality of deflector plate connectors 192. The deflector plate 190 can deflect and/or reduce a velocity of the gaseous feed entering the reactor vessel 120. The deflection and/or redirection in velocity can cause the gaseous feed to be more evenly distributed through the plurality of gas passageways 155.

The gaseous feed conduit 130 can be mounted flush with the refractory-lined inner wall surface 121 or can extend beyond the refractory-lined inner wall surface 121. A ratio of an inside diameter of the gaseous feed conduit 130 to an inside diameter of the reactor vessel 120 can be from 0.06 to 0.77 and preferably from 0.20 to 0.23.

The reactor and feed distribution assembly 110 includes a catalyst feed conduit 140. The reactor and distribution assembly 110 can include a plurality of catalyst feed conduits 140. The plurality of catalyst feed conduits 140 can be operatively connected to a plurality of feed conduit receiving passageways e.g., that encircle the longitudinal axis of the reactor vessel 120.

The catalyst feed conduit 140 includes a first end 141 and a second end 142. The catalyst feed conduit 140 extends through the refractory-lined inner wall surface and the outer wall surface of the reactor vessel 120 such that the second end 142 is positioned above the second surface 152 of the gaseous feed distribution assembly 150. For example, the catalyst feed conduit 140 extends through a catalyst feed conduit receiving passageway 126 and the catalyst feed conduit passageway 157 such that the second end 142 extends beyond the second surface 152 of the gaseous feed distribution assembly 150. A catalyst feed conduit cap 145 can be operatively connected to the second end 142 by one or more connectors 146 that define gaps 147 through which catalyst can flow onto the second surface 152 of the gaseous feed distribution assembly 150. A ratio of an inside diameter of the catalyst feed conduit 140 to the inside diameter of the reactor vessel 120 can be from 0.08 to 0.23 and preferably from 0.12 to 0.15.

The reactor and feed distribution assembly 110 includes a catalyst feed conduit housing 180 in which the catalyst feed conduit 140 is slidably housed. The catalyst feed conduit 140 can be spaced apart from an inner surface 183 of the catalyst feed conduit housing 180. The catalyst feed conduit 140 is slidably housed within the catalyst feed conduit housing 180 to allow for expansion of the catalyst feed conduit 140. For example, the catalyst feed passing through the catalyst feed conduit 140 can be heated, causing the catalyst feed conduit 140 to expand in length and diameter. As such, the catalyst feed conduit 140 can expand, as compared to a reactor where the catalyst feed conduit 140 is welded in place, which can cause a potential for the welds to crack.

The catalyst feed conduit housing 180 includes a first end 181 proximate to the bottom 123, a second end 182 spaced apart from the bottom 123 of the reactor vessel 120 and proximate to the second surface 152 of the gaseous feed distribution assembly 150, and an outer surface 184 that is spaced apart from the inner surface 183 of the catalyst feed conduit housing 180 and operatively connected to an inner circumferential surface 158 of the catalyst feed conduit passageway 157 and to the catalyst feed conduit receiving passageway 126. An inside diameter of the first surface 151 can be welded to and/or supported by the catalyst feed conduit housing 180. For some applications, additional supports can be incorporated between the first surface 151 and the bottom 123.

Catalyst feed conduit 140 insulation packing 149 is disposed between the catalyst feed conduit 140 and the inner surface 183 of the catalyst feed conduit housing 180. The catalyst feed conduit 140 insulation packing 149 can help maintain a temperature of the catalyst feed. For example, a temperature of a gaseous feed entering through the gaseous feed conduit 130 can be different than a temperature of the catalyst feed entering through the catalyst feed conduit 140. For instance, where propane dehydrogenation is being performed in the reactor and feed distribution assembly 110, propane can enter through the gaseous feed conduit 130 at 570 degrees Celsius (° C.) and catalyst can enter the catalyst feed conduit 140 at 750 degrees ° C. As such, if propane contacts the catalyst feed conduit 140, which is heated to 750° C. as a result of the catalyst flowing through it, the propane can coke and cause the reactor and feed distribution assembly 110 to plug.

The reactor and feed distribution assembly 110 includes a catalyst backflow diverter 170 that is operatively connected to the catalyst feed conduit 140 proximate to the second end 142 of the catalyst feed conduit 140. The catalyst backflow diverter 170 extends from the catalyst feed conduit 140 and extends beyond the second end 182 of the catalyst feed conduit housing 180. In an example, the catalyst backflow diverter 170 can reduce catalyst introduction into the catalyst feed conduit 140 insulation packing 149.

Figure 1B:
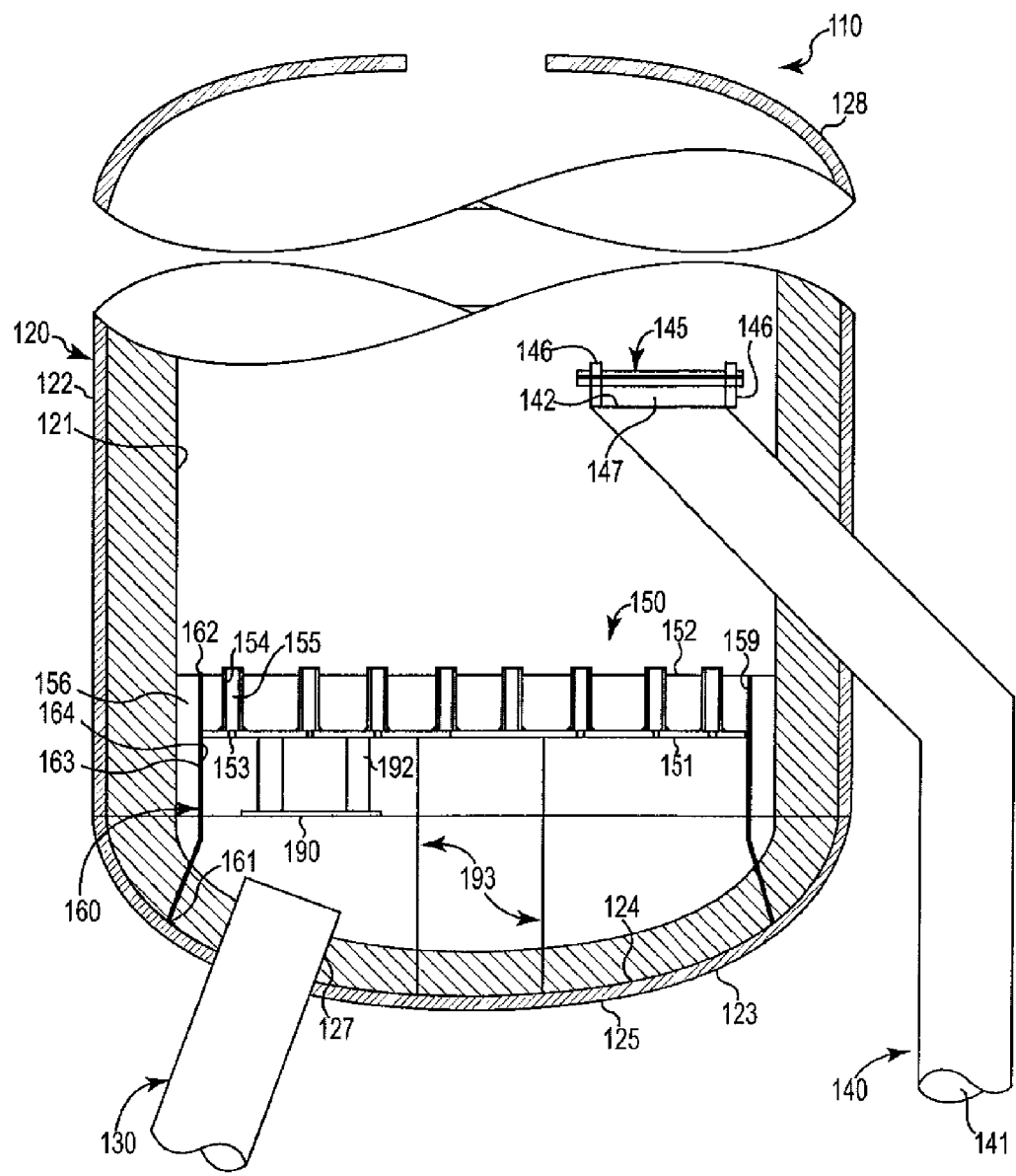
FIG. 1B illustrates a side view of a reactor and feed distribution assembly according to an embodiment of the present disclosure.

FIG. 1B illustrates another embodiment of the reactor and feed distribution assembly 110, which includes the reactor vessel 120. As discussed herein, the reactor vessel 120 includes the refractory-lined inner wall surface 121, the outer wall surface 122, the bottom 123, the top 128, the gaseous feed distribution assembly 150, the mounting plate 160 and the gaseous feed conduit receiving passageway 127. The bottom 123 has the inner surface 124 and the outer surface 125.

The gaseous feed distribution assembly 150, as discussed herein, includes the first surface 151 that faces the inner surface 124, the second surface 152 that is spaced apart from and faces away from the first surface 151, and the outer plate surface 159 having a portion that is normal to the first surface 151 and the second surface 152. As illustrated, the gaseous feed distribution assembly 150 extends over the entire inner diameter of the reactor 110.

The outer plate surface 159 can be welded to the first surface 151. In an example, distribution assembly insulation packing 156 is disposed between a lower portion of refractory-lined inner wall surface 121 that is nearer to where the refractory-lined inner wall surface 121 connects to the bottom 123 that to where the refractory-lined inner wall surface 121 connects to the top 128.

The first surface 151 and/or second surface 152 of the gaseous feed distribution assembly 150 can be refractory-lined, in an example. In addition, other materials with insulating properties (e.g., insulating material) can be disposed between the first surface 151 and the second surface 152, as discussed herein. The gaseous feed distribution assembly 150 defines a plurality of gas passageways 155, as discussed herein. Each of the plurality of gas passageways 155 are in fluid communication with the first surface 151 and the second surface 152 via first apertures 153 and second apertures 154. The plurality of gas passageways 155 can be even with and/or extend past (e.g., below) the first surface 151 and/or the second surface 152. The second apertures 154 can have a greater cross-sectional area than the first apertures 153, e.g., when a cross section of the second apertures 154 and the first apertures 153 are determined perpendicular to a longitudinal axis of one or more of the gas passageways 155 and a longitudinal axis of the catalyst feed tube.

The first apertures 153 and the second apertures 154 of the gaseous feed distribution assembly 150 can have uniform and/or varying cross-sectional areas, as discussed herein. A ratio of an inside diameter of the first apertures 153 of the gaseous feed distribution assembly 150 to an inside diameter of the second apertures 154 of the gaseous feed distribution assembly 150 can be from 0.13 to 0.63 and preferably from 0.34 to 0.51. A ratio of the inside diameter of the first apertures 153 of the gaseous feed distribution assembly 150 to the inside diameter of the reactor vessel 120 is from 0.003 to 0.014 and preferably from 0.008 to 0.012. A ratio of the inside diameter of the second apertures 154 of the gaseous feed distribution assembly 150 to the inside diameter of the reactor vessel 120 is from 0.008 to 0.163 and preferably from 0.026 to 0.067.

The reactor and feed distribution assembly 110 also includes a mounting plate 160 for mounting and/or supporting the gaseous feed distribution assembly 150 to the reactor vessel 120 at the bottom 123, as discussed herein. The mounting plate 160 includes a first end 161, which is operatively connected to the bottom 123, and a second end 162. The first end 161 and the second end 162 are spaced apart from one another and there between define an outer planar surface 163 that is spaced apart from an inner planar surface 164. The outer planar surface 163 is spaced apart from the refractory-lined inner wall surface 121 and the outer plate surface 159 is operatively connected to a portion of the inner planar surface 164 proximate to the second end 162 and apart from the first end 161.

The reactor and feed distribution assembly 110 seen in FIG. 1B includes the gaseous feed conduit 130 that is operatively connected to the gaseous feed conduit receiving passageway 127 that extends through the bottom 123 of the reactor vessel 120, as discussed herein. The gaseous feed conduit 130 can be mounted flush with the refractory-lined inner wall surface 121 or can extend beyond the refractory-lined inner wall surface 121. A ratio of an inside diameter of the gaseous feed conduit 130 to an inside diameter of the reactor vessel 120 can be from 0.06 to 0.77 and preferably from 0.20 to 0.23.

The reactor and feed distribution assembly 110 illustrated in FIG. 1B can also include a deflector plate 190 spaced apart from, and operatively connected to, a portion of the first surface 151 of the gaseous feed distribution assembly 150 by a plurality of deflector plate connectors 192, as discussed herein.

The reactor and feed distribution assembly 110 of FIG. 1B includes the catalyst feed conduit 140 which can enter in either an upward (as shown in FIG. 1B) or a downward orientation. The catalyst feed conduit 140 includes a first end 141 and a second end 142. As illustrated in FIG. 1B, the catalyst feed conduit 140 extends through the refractory-lined inner wall surface 121 and the outer wall surface 122 of the reactor vessel 120 such that the second end 142 is positioned above the second surface 152 of the gaseous feed distribution assembly 150. For this embodiment, the catalyst feed conduit 140 can be welded to the reactor vessel 120.

As shown in FIG. 1B, the catalyst feed conduit cap 145 can be operatively connected to the second end 142 by one or more connectors 146 that define gaps 147 through which catalyst can flow onto the second surface 152 of the gaseous feed distribution assembly 150. The ratio of the inside diameter of the catalyst feed conduit 140 to the inside diameter of the reactor vessel 120 can be from 0.08 to 0.23 and preferably from 0.12 to 0.15.

The reactor and distribution assembly 110 can include a plurality of catalyst feed conduits 140. The plurality of catalyst feed conduits 140 can be operatively connected to a plurality of feed conduit receiving passageways e.g., that encircle the longitudinal axis of the reactor vessel 120. In an additional embodiment, a combination of catalyst entry through the catalyst feed conduit receiving passageway 126 and the catalyst feed conduit passageway 157 as shown in FIG. 1A and the opening in the reactor vessel 120 as shown in FIG. 1B is also possible.

The reactor and feed distribution assembly 110 can also include vertical mechanical supports 193, as illustrated in FIG. 1B. As illustrated, the vertical mechanical supports 193 can be positioned between and secured to the inner surface 124 of the vessel 120 and the first surface 151 of the gaseous feed distributor assembly 150, which faces the inner surface 124. The vertical mechanical supports 193 can help to maintain structural stability for the gaseous feed distribution assembly 150 and are provided in a number and configuration that is appropriately for the load provided by the gaseous feed distribution assembly 150.

Figure 2:
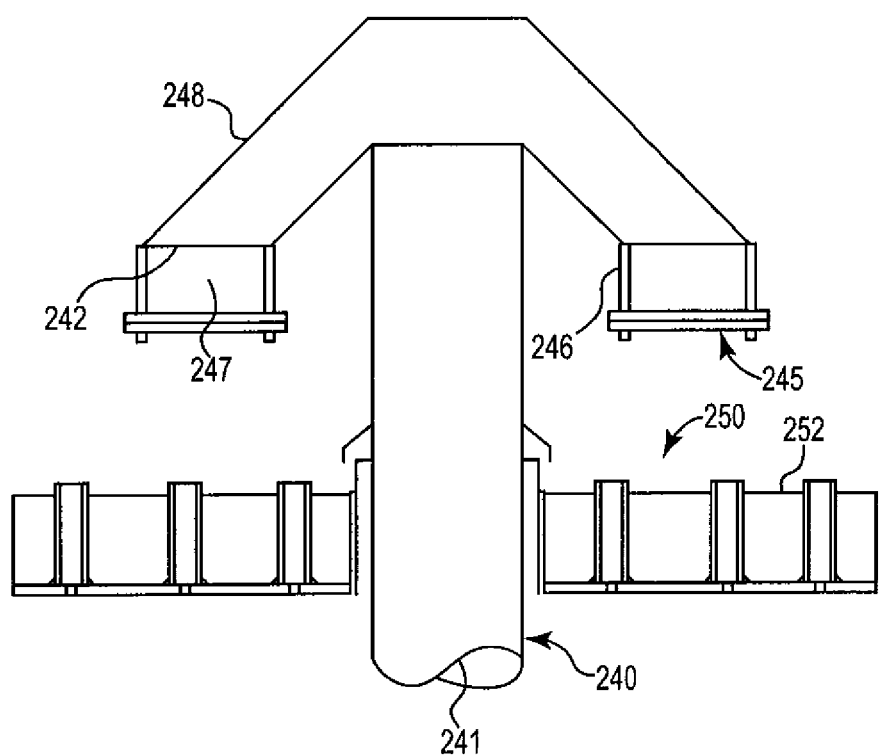
FIG. 2 illustrates a side view of a catalyst feed conduit according to an embodiment of the present disclosure.

As shown in FIG. 2, a catalyst feed conduit 240 can be split into a plurality of second ends 242 that extend radially from the catalyst feed conduit 240. A plurality of catalyst feed conduit caps 245 can be operatively connected to each of the plurality of second ends 242 by one or more connectors 246 that define gaps 247. Catalyst can flow through a first end 241 of the catalyst feed conduit 240, through catalyst feed conduit arms 248, and through the gaps 247 onto a second surface 252 of a gaseous feed distribution assembly 250. The catalyst feed conduit arms 248 can extend over the gaseous feed distribution assembly 250, which can help to distribute catalyst over a diameter of the gaseous feed distribution assembly 250. The catalyst feed conduit arms 248 can be parallel with the second surface 152 of the gaseous distribution assembly 250, can extend away from the second surface 252 of the gaseous distribution assembly 250, and/or extend toward the second surface 252 of the gaseous distribution assembly 250 to help promote mixing of the catalyst and the gas.

Figure 3:
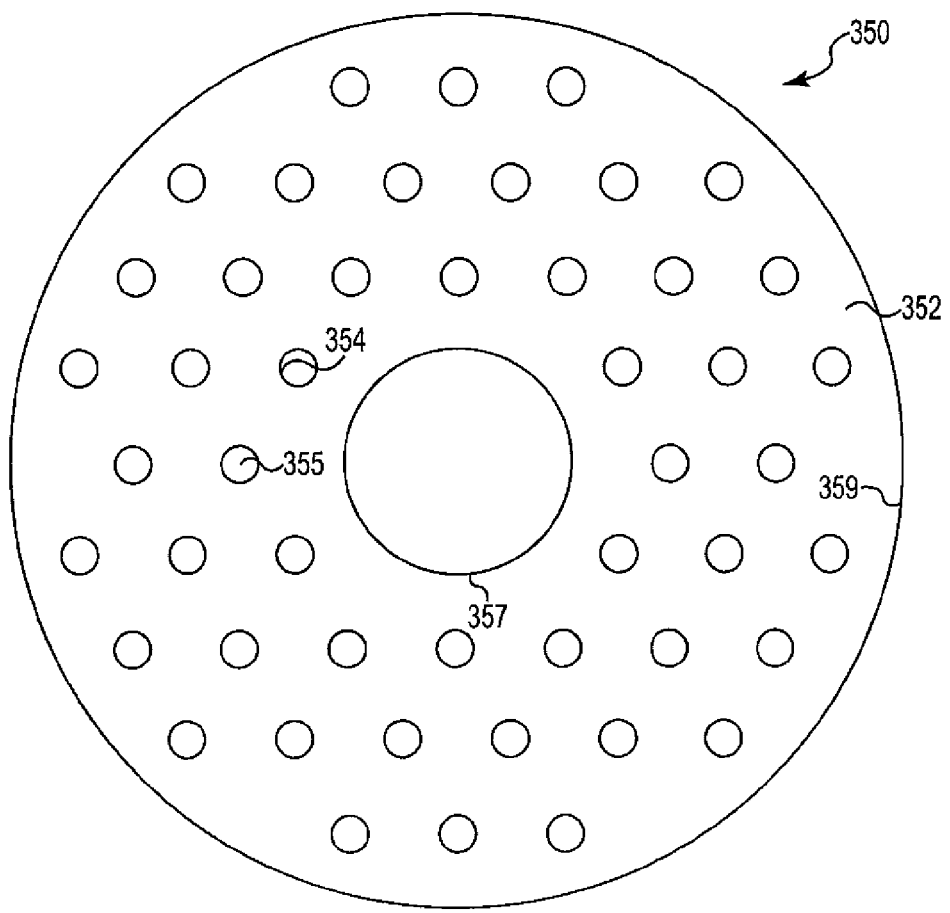
FIG. 3 illustrates a top view of a gaseous feed distribution assembly according to an embodiment of the present disclosure.

As shown in FIG. 3, the gaseous feed distribution assembly 350 can include a second surface 352 and outer plate surface 359. The second surface 352 can include a plurality of gas passageways 355, formed by second apertures 354 of the gaseous feed distribution assembly 350. The plurality of gas passageways 355 can be arranged around catalyst feed conduit passageway 357 in a geometric pattern. The geometric pattern may be different for various applications. For example, the plurality of gas passageways 355 can be arranged around the catalyst feed conduit passageway 357 in a grid and/or concentrically. The gaseous feed distribution assembly 250 can include 10 to 50 gas passageways per square meter and preferably between 20 to 35 gas passageways per square meter, however other numbers of gas passageways per square meter may also be possible.

What is claimed is:

1. A reactor and feed distribution assembly comprising:
    a reactor vessel having a refractory-lined inner wall surface, an outer wall surface, a bottom, a top, a gaseous feed distribution assembly, and a mounting plate, wherein:
        the bottom has an inner surface and an outer surface,
        the gaseous feed distribution assembly has a first surface that faces the inner surface, a second surface that is spaced apart from and faces away from the first surface, and an outer plate surface having a portion that is normal to the first surface and the second surface, wherein the gaseous feed distribution assembly defines a plurality of gas passageways, each of the plurality of gas passageways being in fluid communication with the first surface and the second surface via first apertures and second apertures, the second apertures having a greater cross-sectional area than the first apertures, and wherein distribution assembly insulation packing is disposed between a lower portion of refractory-lined inner wall surface that is nearer to where the refractory-lined inner wall surface connects to the bottom than to where the refractory-lined inner wall surface connects to the top,
        the mounting plate having a first end, which is operatively connected to the bottom, and a second end, wherein the first end and the second end are spaced apart from one another and there between define an outer planar surface that is spaced apart from an inner planar surface, the outer planar surface being spaced apart from the refractory-lined inner wall surface, the outer plate surface being operatively connected to a portion of the inner planar surface proximate to the second end and apart from the first end,
    a gaseous feed conduit that is operatively connected to a gaseous feed conduit receiving passageway that extends through the bottom of the reactor vessel;
    a catalyst feed conduit that has a first end and a second end, the catalyst feed conduit extending through the refractory-lined inner wall surface and the outer wall surface such that the second end is positioned above the second surface of the gaseous feed distribution assembly;
    a catalyst feed conduit receiving passageway; and
    a catalyst feed conduit housing in which the catalyst feed conduit is slidably housed, the catalyst feed conduit being spaced apart from an inner surface of the catalyst feed conduit housing, the catalyst feed conduit housing having a first end proximate to the bottom of the reactor vessel, a second end spaced apart from the bottom of the reactor vessel and proximate to the second surface of the gaseous feed distribution assembly, and an outer surface that is spaced apart from the inner surface of the catalyst feed conduit housing and operatively connected to an inner circumferential surface of a catalyst feed conduit passageway and to the catalyst feed conduit receiving passageway, wherein catalyst feed conduit insulation is disposed between the catalyst feed conduit and the inner surface of the catalyst feed conduit housing.

2. The reactor and feed distribution assembly of claim 1, further comprising a plurality of gaseous feed conduits.

3. The reactor and feed distribution assembly of claim 1, further comprising a plurality of catalyst feed conduits.

4. The reactor and feed distribution assembly of claim 1, wherein a ratio of an inside diameter of the first apertures of the gaseous feed distribution assembly to an inside diameter of the second apertures of the gaseous feed distribution assembly is from 0.13 to 0.63.

5. The reactor and feed distribution assembly of claim 1, wherein a ratio of the inside diameter of the first apertures of the gaseous feed distribution assembly to an inside diameter of the reactor vessel is from 0.003 to 0.014.

6. The reactor and feed distribution assembly of claim 1, wherein a ratio of the inside diameter of the second apertures of the gaseous feed distribution assembly to the inside diameter of the reactor vessel is from 0.008 to 0.163.

7. The reactor and feed distribution assembly of claim 1, wherein a ratio of an inside diameter of the gaseous feed conduit to the inside diameter of the reactor vessel is from 0.06 to 0.77.

8. The reactor and feed distribution assembly of claim 1, wherein a ratio of an inside diameter of the catalyst feed conduit to the inside diameter of the reactor vessel is from 0.08 to 0.23.

9. The reactor and feed distribution assembly of claim 1, further comprising a deflector plate spaced apart from, and operatively connected to, a portion of the first surface of the gaseous feed distribution assembly by way of a plurality of deflector plate connectors.

10. The reactor and feed distribution assembly of claim 1, further comprising:
    a catalyst backflow diverter that is operatively connected to the catalyst feed conduit proximate to the second end of the catalyst feed conduit, the catalyst backflow diverter extending from the catalyst feed conduit and extending beyond the second end of the catalyst feed conduit housing.

* * * * *